United States Patent

[11] 3,609,171

[72] Inventors Henry Laurent;
 Ulrich Kerb; Karl Heinz Kolb; Rudolf
 Wiechert; Erich Gerhards, all of Berlin,
 Germany
[21] Appl. No. 753,034
[22] Filed Aug. 15, 1968
[45] Patented Sept. 28, 1971
[73] Assignee Schering Aktiengesellschaft
 Berlin and Bergkamen, Germany
[32] Priority Aug. 16, 1967
[33] Germany
[31] P 16 43 036.7

[54] 11-HALOGEN-SUBSTITUTED STEROIDS
 26 Claims, No Drawings
[52] U.S. Cl. ................................................... 260/397.45
[51] Int. Cl. ............................................C07c 169/30

[50] Field of Search............................................ 260/397.45

[56] References Cited
UNITED STATES PATENTS
| | | | |
|---|---|---|---|
| 3,501,513 | 3/1970 | Bacso............................ | 260/397.45 |
| 3,415,855 | 1/1968 | Shapiro et al.................. | 260/397.45 |
| 3,422,193 | 1/1969 | Shapiro et al.................. | 424/243 |
| 3,426,128 | 2/1969 | Kieslich et al. ............... | 424/243 |

*Primary Examiner*—Elbert L. Roberts
*Attorney*—Michael S. Striker

ABSTRACT: 11-halogen-substituted-steroids of the formula wherein R is hydrogen or a cyl and X and Y are halogen, the molecular weight of Y being at least equal to that of X.

The products of the invention are useful for pharmaceutical applications to reduce inflammations.

11-HALOGEN-SUBSTITUTED STEROIDS

Background of the Invention

Steroids are known which have an inflammation reducing effect. For instance, 6α-fluoro-11β21-dihydroxy-16α-methyl-1,4-pregnadiene-3,20-dione has been used for this purpose. However, it appeared desirable to improve the prior art compounds as to the inception of their action and also as to the time interval existing between inception and maximum effect.

There was furthermore a desire to increase the effectiveness of the drugs and to eliminate or further reduce undesirable side effects.

Summary of the Invention

It is therefore a specific object of the present invention to provide for an anti-inflammatory drug which becomes speedily effective after application.

Another object is a drug of this type which will reach its maximum action in a comparatively short time.

Further objects are an improvement of the intensity of the action and a reduction of undesirable side effects.

All these and other objects, as will appear from the specification that follows, are accomplished by a compound consisting of

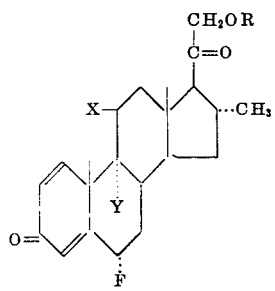

wherein R is hydrogen or acyl and X and Y are halogen, the molecular weight of Y being at least equal to that of X.

The invention also comprises a process for making these compounds by halogenating the $\Delta^{9(11)}$-double bond of a corresponding steroid.

Depending on whether the original product is a 21-hydroxy or 21-ester product, the final product may eventually be subjected to a sapondification and/or esterification step.

DESCRIPTION OF THE PREFERRED EMBODIMENTS

With reference to the general formula set forth in the above summary, it will be understood that R may comprise physiologically acceptable acid residues as they are used in conventional processes in steroid chemistry for esterification of free hydroxyl groups. Preferred are esters having up to 15 carbon atoms, particularly the lower and intermediate aliphatic carboxylic acids. The acids can also be unsaturated, branched, polycarboxylic or conventionally substituted, for instance by hydroxy- or amino-groups or halogen atoms. Suited are also cycloaliphatic, aromatic, mixed aromatic-aliphatic or heterocyclic acids, all of which may also be substituted in a suitable manner. Examples of such acids are the following: formic acid, acetic acid, propionic acid, butyric acid, valeric acid, caproic acid, enanthic acid, undecylic acid, trimethylacetic acid, diethylacetic acid, tert. butylacetic acid, phenyl-acetic acid, cyclopentylpropionic acid, oleic acid, lactic acid, mono-, di- and trichloroacetic acid, aminoacetic acid, succinic acid, adipic acid, benzoic acid and nicotinic acid. There could also be used customary inorganic acids, such as sulfuric, nitric or phosphoric acid.

A preferred product for obtaining the compounds of the invention consists in the halogenation of the 9,11-positions of corresponding steroids. The starting products of the invention thus may be the following:

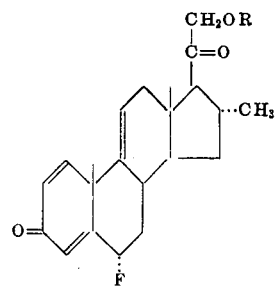

wherein R is hydrogen or acyl.

These starting products can be obtained by dehydrating the corresponding 11-hydroxy compounds. The dehydration can be effected, for instance, by reacting the 11-hydroxy-21-acyloxy-steroids with methanesulfochloride in pyridine and dimethylformamide.

For instance, 6α-fluoro-21-hydroxy-16α-methyl-1,4,9(11)-pregnatriene-3,20-dione can be obtained in a smooth reaction by saponifying the corresponding 21-ester.

The addition of the halogen to the $\Delta^{9(11)}$-double bond can be effected in a number of ways. For instance, halogens such as chlorine or bromine or intercompounds of different halogens such as chlormonofluoride or brommonochloride or halogens derived from polyhalides such as potassium triiodide or iodobenzyldichloride, may be substituted directly at the double bond by an addition reaction. The halogen substitution will proceed with greatest ease if the $\Delta^{9(11)}$-steroids are simultaneously reacted with a positive and a negative halogen. Reagents containing a positive halogen are, for instance, halogenosuccinimide, halogeno-acetamide or the halogens proper. Reagents for supplying the negative halogen are, for instance, the hydrogen halides and alkali metal halides. The substitution of the halogen at the $\Delta^{9(11)}$-double bond of the steroid always proceeds in a manner where the positively charged halogen attaches to the 9-position and the negatively charged halogen attaches to the 11-position of the molecule. The molecular weight of the halogen in the 9-position therefore can never be smaller than that of the halogen in the 11-position. The halogen addition to the $\Delta^{9(11)}$-double bond is preferably carried out at temperatures between −75° C. and +50° C.

The free hydroxyl group or ester group in the 21-position can subsequently be esterified or saponified in conventional manner. It is advisable, however, to use mild conditions in order to obtain a good yield.

The new compounds have an excellent anti-inflammatory action, as determined in the vasoconstriction tests carried out with male test subjects after local application. This is further illustrated in the tests listed in Table 1 below, where Compounds II to IX are compared with the prior art Compound I, which is 6α-fluoro-11β21-dihydroxy-16α-methyl-1,4-pregnadiene-3,20-dione.

The vasoconstriction test to determine the clinical-experimental superiority of the compounds of the invention was carried out as follows:

The stratum corneum on the backs of male test subjects of the ages from 18 to 38 was subdivided with a Tesa film of 2 cm. width by means of 20 scratches applied above each other so as to cause a marked hyperemia. 4 cm.² large areas were then set apart in the exposed skin portion and 50 mg. of a water/oil ointment base were applied to those areas upon simultaneous application of pressure. The base in each instance contained 0.01%, 0.001% and 0.0001%, respectively, of the tested compound. The back of the subject was then photographed with a Kodak color film at predetermined intervals. The color of the individual skin areas appearing on the Kodak color film was then converted to light intensity values to determine the hyperemia and vasoconstriction. The portions projected by the color film through an apertured disk onto an interference filter could then be distinguished by their light intensity. A secondary electron multiplier of the FS9A type was used as light intensity indicator and the color value was measured by the anode current of the secondary multiplier. The color value of the untreated and the treated abraded skin was determined and compared with the color value of normal skin, since the vasoconstriction can be considered as the representative syndrome of the anti-inflammation action and can be appraised as to inception, intensity and duration of the action. The color value of the normal skin in these tests was set at 100 and the color value of untreated abraded skin was set at 0. There could thus be evaluated low, intermediate and high vasoconstriction by ascertaining the values between 0 and 100.

TABLE 1

| Test No. | Compound | Dose, per-cent | Time after which observation took place (in hrs) | | | | | | |
|---|---|---|---|---|---|---|---|---|---|
| | | | 1 | 2 | 3 | 4 | 5 | 6 | 7 |
| I | 6α-fluoro-11β,21-di-hydroxy-16α-methyl-1,4-pregnadiene-3,20-dione. | 0.01 | 0 | 25 | 40 | 50 | 100 | | |
| | | 0.001 | 0 | 20 | 55 | 75 | 100 | | |
| | | 0.0001 | 0 | 15 | 25 | | 50 | 90 | 100 |
| II | 6α-fluoro-9,11β-di-chloro-21-acetoxy-16α-methyl-1,4-pregnadiene-3,20-dione. | 0.01 | 5 | 30 | 75 | 95 | 100 | | |
| | | 0.0001 | 0 | 15 | 30 | 60 | 85 | 100 | |
| III | 6α,11β-difluoro-9-chloro-21-acetoxy-16α-methyl-1,4-pregnadiene-3,20-dione. | 0.01 | 15 | 35 | 80 | 100 | | | |
| | | 0.001 | 15 | 40 | 75 | 100 | | | |
| | | 0.0001 | 0 | 30 | 60 | 90 | 100 | | |
| IV | 6α,11β-difluoro-9-chloro-21-tri-methyl-acetoxy-16α-methyl-1,4-pregnadiene-3,20-dione. | 0.01 | 25 | 55 | 100 | | | | |
| | | 0.001 | 10 | 50 | 75 | 100 | | | |
| | | 0.0001 | 10 | 40 | 60 | 85 | 100 | | |
| V | 6α,11β-difluoro-9-chloro-21-butyryl-oxy-16α-methyl-1,4-pregnadiene-3,20-dione. | 0.01 | 15 | 45 | 95 | 100 | | | |
| | | 0.001 | 15 | 50 | 75 | 100 | | | |
| | | 0.0001 | 0 | 30 | 55 | 90 | 100 | | |
| VI | 6α-fluoro-9,11β-di-chloro-21-tri-methyl-acetoxy-16α-methyl-1,4-pregnadiene-3,20-dione. | 0.01 | 10 | 55 | 85 | 100 | | | |
| | | 0.0001 | 10 | 40 | 75 | 90 | 100 | | |
| VII | 6α-fluoro-9,11β-di-chloro-21-butyryl-oxy-16α-methyl-1,4-pregnadiene-3,20-dione. | 0.01 | 15 | 55 | 90 | 100 | | | |
| | | 0.001 | 20 | 50 | 80 | 100 | | | |
| | | 0.0001 | 0 | 35 | 60 | 90 | 100 | | |
| VIII | 6α-fluoro-9,11β-di-chloro-21-valeryl-oxy-16α-methyl-1,4-pregnadiene-3,20-dione. | 0.01 | 10 | 40 | 80 | 95 | 100 | | |
| | | 0.001 | | | | | | | |
| | | 0.0001 | 0 | 25 | 50 | 80 | 100 | | |
| IX | 6α,11β-difluoro-9-chloro-21-valeryl-oxy-16α-methyl-1,4-pregnadiene-3,20-dione. | 0.01 | 15 | 55 | 90 | 100 | | | |
| | | 0.001 | 10 | 40 | 90 | 100 | | | |
| | | 0.0001 | 0 | 25 | 40 | 90 | 100 | | |

The above tests of Table 1 clearly demonstrate that apart from an earlier inception of the action, the desired maximum action is reached faster with the compounds of the invention than with the comparison compound. The intensity of action of the new compounds is also greater throughout the time tested than with the known product. In addition, there is a more desirable pattern of side effects with the compounds of the invention. For instance, the carbohydrate metabolism is affected either not at all or only to a minor extent. The gluconeogenetic action is also substantially reduced as appears, for instance, from the fact that the blood sugar concentration is not increased and that the liver glycogen starts increasing only at an extremely high dose. There is also a minor effect on the liver enzyme, tryptophanepyrrolase and the transaminases GOT and GPT. Significantly minor is also the change in sodium, potassium and phosphate elimination under the action of the compounds of the invention.

The compounds of the invention are valuable—in combination with the conventional carriers used in Galenical pharmacy—in connection with treatment of a number of diseases, such as:

a. by local administration: contact dermatitis, varied exzemas, neurodermatitis, erythrodermia, first degree burns, pruritis vulvae et ani, rosacea erythematodes cutaneus, psoriasis, lichen ruber planus and verrucosus;

b. by oral administration: acute and chronic polyarthritis, neurodermatitis, bronchial asthma, hay fever, etc.

The following Examples will further illustrate the invention without any intention of limitation.

Example 1

18 ml. anhydrous fluoric acid were reacted with 25 ml. tetrahydrofuran and 35 ml. methylenechloride at −75° C. 8.70 g. 6α-fluoro-21-acetocy-16α-methyl-1,4,9(11)-pregnatriene-3,20-dione (melting point 160–162° C.) and 4.6 g. N-bromosuccinimide were dissolved in this mixture. The solution was stirred for 3.5 hours at −50° C. and then poured into a solution of 120 g. sodiumbicarbonate in 3.5 l. water. It was then extracted with methylene chloride and the organic phase was washed with water and dried and the solvent was evaporated in vacuum. There were obtained from acetone hexane 6.39 g. 6α,11β-difluoro-9-bromo-21-acetoxy-16α-methyl-1,4-pregnediene-3,-20-dione with a melting point between 210.5 and 211° C.; UV: $\epsilon_{236}$=15,200.

Example 2

42 ml. anhydrous fluoric acid, 57 ml. tetrahydrofuran and 80 ml. methylenechloride were added together at −75° C. 20 g. 6α-fluoro-21-acetoxy- 16α-methyl-1,4,9(11)-pregnatriene-3,20-dione and 10 g. N-chlorosuccinimide were dissolved in this mixture, and after stirring the solution for 5 hours at −60° C., additional 20 g. N-chlorosuccinimide were added and the reaction mixture was permitted to stand for 16 hours at 0° C. The mixture was then poured into a solution of 270 g. sodium bicarbonate in 3 l. water and was extracted with methylenechloride. The organic phase was washed with a sodiumhydrogensulfide-sodiumbicarbonate solution and water. After drying, the solvent was evaporated in vacuum. There were obtained from acetone/hexane 12.4 g. 6α,11β-difluoro-9-chloro-21-acetoxy-16α-methyl-1,4-pregnadiene-3,20-dione with a melting point of 249.5–250° C. UV: $\epsilon_{236}$= 15,900.

Example 3

A solution of 1.0 g. 6α,11β-difluoro-9-bromo-21-acetoxy-16α-methyl-1,4-pregnadiene-3,20-dione in 3.0 ml. methylenechloride was reacted at −10° C. with 6.2 ml. of a 0.2 n sodiummethylate solution in methanol. The reaction mixture was subjected to stirring for 45 minutes in a nitrogen atmosphere at −10° C., neutralized with acetic acid and extracted with methylenechloride. The organic phase was washed with sodium bicarbonate and water, dried and concentrated in vacuum. The residue was recrystallized from acetone/hexane. There were obtained 774 mg. 6α,11β-difluoro-9-bromo-21'-hydroxy-16α-methyl-1,4-pregnadiene-3,20-dione with a melting point between 206 and 206.5° C. UV: $\epsilon_{239}$=14.900.

Example 4

1.0 g. 6α,11β-difluoro-9-chlro-21-acetocy-16α-methyl-1,4-pregnadiene-3,20-dione was saponified with sodiummethylate, following the conditions given in Example 3. There were obtained 770 mg. 6α,11β-difluoro-9-chloro-21-hydroxy-16α-methyl-1,4-pregnadiene-3,20-dione, melting point 211.5 to 214° C. (acetone/hexane). UV: $\epsilon_{236}$=16,500.

Example 5

A solution of 2.75 g. 6α,11β-difluoro-9-bromo-21-hydroxy-16α-methyl-1,4-pregnadiene-3,20-dione in 11 ml. pyridine and 5.5 ml. butyricacidanhydride was permitted to stand for 16 hours at room temperature. The precipitated crystalline substance was isolated after addition of water and was twice recrystallized from acetone. There were obtained 2.45 g. 6α,11β-difluoro-9-bromo-21-butyryloxy-16α-methyl-1,4-pregnadiene-3,20-dione with a melting point between 164.5 and 165.5° C. UV: $\epsilon_{238}$=15,000.

Example 6

3.95 g. 6α,11β-difluoro-9-chloro-21-hydroxy-16α-methyl-1,4-pregnadiene-3,20-dione were reacted in the manner stated in Example 5. There were obtained 3.16 g. 6α,11β-difluoro-9-chloro-21-butyryloxy-16α-methyl-1,4-pregnadiene-3,20-dione with a melting point between 183 and 184° C. (acetone/hexane). UV: $\epsilon_{236}$=16,600.

Example 7

A solution of 2.75 g. 6α,11β-difluoro-9-bromo-21-hydroxy-16α-methyl-1,4-pregnadiene-3,20-dione in 40 ml. methylenechloride was reacted with 5.5 ml. trimethylacetic acid anhydride and 14 ml. of a 20% aqueous sodium hydroxide solution. The mixture was heated upon vigorous stirring and under reflux to 40° C. in a nitrogen atmosphere. After 2 hours it was washed neutral with water, dried and subjected to evaporation of the solvent in a vacuum. The residue was twice recrystallized from acetone/hexane. There were obtained 2.58 g. 6α,11β-difluoro-9-bromo-21-trimethylacetoxy-16α-methyl-1,4-pregnadiene-3,20-dione with a melting point between 190.5 and 191° C. UV: $\epsilon_{239}$=15,000.

Example 8

3.73 g. 6α,11β-difluro-9-chloro-21-hydroxy-16α-methyl-1,4-pregnadiene-3,20-dione were reacted with trimethylaceticacidanhydride in the manner described in example 7. There were obtained 3.04 g. 6α,11β-difluoro-9-chloro-21-trimethylacetoxy-16α-methyl-1,4-pregnadiene-3,20-dione with a melting point between 196 and 198° C. (acetone/hexane). UV: $\epsilon_{236}$=16,500.

Example 9

A solution of 10.0 g. 6α-fluoro-21-acetoxy-16α-methyl-1,4,9(11)-pregnatriene-3,20-dione in 300 ml. acetic acid was reacted with 50.0 g. lithiumchloride and a solution of 2.3 g. chlorine in 200 ml. acetic acid and was subjected to stirring for 2.5 hours at room temperature. The solution was then poured into water, the precipitated product was removed by suction, washed with water and dried in vacuum. The crude product was subjected to chromatography through silica gel. After recrystallization from acetone/hexane, there were obtained 2.23 g. 6α-fluoro-9,11β-dichloro-21-acetoxy-16α-methyl-1,4-pregnadiene-3,20-dione with a melting point between 239 and 240° C. UV: $\epsilon_{236}$=16,200.

Example 10

6 ml. anhydrous fluoric acid were reacted at −75° C. with 9 ml. tetrahydrofuran and 12 ml. methylene-chloride. 3.0 g. 6α-fluoro-21-hydroxy-16α-methyl-1,4,9(11)-pregnatriene-3,20-dione (melting point 172–173° C.) and 1:5 g. N-bromosuccinimide were dissolved in this mixture. It was then subjected to stirring for 4 hours at −50° C. and poured into a solution of 40 g. sodium bicarbonate in 1.2 l. water, followed by drying an evaporation in vacuum. After recrystallization from acetone/hexane, there were obtained 1.57 g. 6α,11β-difluoro-9-bromo-21-hydroxy-16α-methyl-1,4-pregnadiene-3,20-dione with a melting point between 205 and 206° C. UV: $\epsilon_{239}$=14,800.

Example 11

A solution of 1.68 g. 6α-fluoro-21-acetoxy-16α-methyl-1,4,9(11)-pregnatriene in 85 ml. acetic acid was reacted with 8.5 g. lithiumchloride, 1.68 g. N-bromoacetamide and 3.4 ml. HCl-saturated dioxane The mixture was subjected to stirring at room temperature for one hour, then poured into water, whereupon the precipitated product was removed by suction, washed with water and dried in vacuum. After recrystallization, there were obtained 1.29 g. 6α-fluoro-11β-chloro-9-bromo-21-acetoxy-16α-methyl-1,4-pregnadiene-3,20-dione with a melting point of 186.5–187.5° C. UV: $\epsilon_{239}$=14,300.

Example 12

6.7 g. 6α-fluoro-11β-chloro-9-bromo-21-acetoxy-16α-methyl-1,4-pregnadiene-3,20-dione were saponified with sodium-methylate in the manner described in example 3. The yield was 4.8 g. 6α-fluoro-11β-chloro-9-bromo-21-hydroxy-16α-methyl-1,4-pregnadiene-3,20-dione with a melting point between 162 and 163° C. UV: $\epsilon_{238}$=14,400.

Example 13

A solution of 250 mg. 6α-fluoro-11β-chloro-9-bromo-21-hydroxy-16α-methyl-1,4-pregnadiene-3,20-dione in 1.25 ml. dimethylformamide was reacted with 0.5 ml. chloroacetylchloride upon cooling with ice. The mixture was stirred at room temperature for 45 minutes and subsequently poured into water. The precipitate was removed by filtration, washed, dried and recrystallized from acetone/hexane. Yield: 180 mg. 6α-fluoro-11β-chloro-9-bromo-21-chloroacetoxy-16α-methyl-1,4-pregnadiene-3,20-dione with a melting point between 197.5 and 198° C. UV: $\epsilon_{238}$=14,600.

Example 14

1.0 g. 6α-fluoro-9,11β-dichloro-21-acetoxy-16α-methyl-1,4-pregnadiene-3,20-dione were saponified in the manner described in example 3. There were obtained 780 mg. 6α-fluoro-9,11β-dichloro-21hydroxy-16α-methyl-1,4-pregnadiene-3,20-dione with a melting point between 213 and 218° C. (acetone/hexane). UV: $\epsilon_{236}$=17,000.

Example 15

7.0 ml. aceticacidanhydride were reacted with 4.5 ml. conc. nitric acid (D=1.50) at −10° C To this mixture was added, upon stirring, a solution of 700 mg. 6α-fluoro-9,11β-dichloro-21-hydroxy-16α-methyl-1,4-pregnadiene-3,20-dione in 30 ml. chloroform. The mixture was subjected to stirring at −10° C. for 30 minutes, poured into ice water and extracted with methylenechloride. The organic phase was washed with a sodium bicarbonate solution and water, dried, and concentrated in vacuum. The residue was recrystallized from acetone/hexane. There were obtained 407 mg. 6α-fluoro-9,11β-dichloro-21nitryloxy-16α-methyl-1,4-pregnadiene-3,20-dione with a melting point 198–200° C. UV: $\epsilon_{236}$=16,700.

Example 16

A solution of 500 mg. 6α-fluoro-21-hexanoyloxy-16α-methyl-1,4,9(11)-pregnatriene-3,20-dione (melting point 119.5–120° C.) in 25 ml. conc. acetic acid was reacted with 2.5 g. lithiumchloride, 500 mg. N-bromosuccinimide and 1.0 ml. HCl-saturated dioxane. The mixture was subjected to stirring at room temperature for 45 minutes and then poured into water. The precipitated product was removed by section, washed with water and dried in vacuum. After recrystallization from methanol there were obtained 444 mg. 6α-fluoro-11β-chloro-9-bromo-21hexanoyl-oxy-16α-methyl-1,4-pregnadiene-3,20-dione with a melting point between 113 and 115° C. UV: $\epsilon_{239}$=15,200.

Example 17

3.0 g. 6α-fluoro-9,11β-dichloro-21-hydroxy-16α-methyl-1,4-pregnadiene-3,20-dione were reacted with trimethylacetic acidanhydride in the manner described in example 7. The crude product was then purified by chromatography through silica gel. By elution with 9.5–12% acetone/pentane there were obtained 980 mg. 6α-fluoro-9α,11β-dichloro-21-trimethylacetoxy-16α-methyl-1,4-pregnadiene-3,20-dione with a melting point 189–190° C. (acetone/hexane). UV: $\epsilon_{237}$=14,700.

Example 18

8.5 ml. anhydrous fluoric acid, 11.5 ml. tetrahydrofuran and 16 ml. methylenechloride were added together at −75° C. 4.0 g. 6α-fluoro-21-hexanoyl-oxy-16α-methyl-1,4,9(11)-pregnatriene-3,20-dione and 8.0 g. N-chlorosuccinimide were dissolved in this mixture and the product was then stirred for 3 hours at −50° C. and thereafter was permitted to stand for another 16 hours at 0° C. and was then finally poured into a solution of 45 g. sodium bicarbonate in 1.5 l. water, was dried with sodium sulfate and subjected to evaporation of the solvent in vacuum. The residue was recrystallized from acetone/hexane. There were obtained 3.10 g. 6α,11β-difluoro-9α-chloro-21-hexanoyloxy-16α-methyl-1,4-pregnadiene-3,20-dione with a melting point between 121–122° C. (acetone/hexane) UV: $\epsilon_{236}=15,500$.

Example 19

A solution of 3.82 g. 6α-fluoro-21hexanoyloxy-16α-methyl-1,4,9(11)-pregnatriene-3,20-dione in 20 ml. conc. acetic acid was reacted with 20 g. lithium-chloride, 3.82 g. N-chlorosuccinimide and 3.82 ml. HCl-saturated-dioxane. The solution was stirred for one hour and poured into water, whereupon the precipitated product was removed by suction, washed with water, and dried. The crude product was subjected to chromatography through silica gel. Elution with 10.5–11.5% acetone/pentane yielded 1.61 g. 6α-fluoro-9-α,11β-dichloro-21-hexanoyloxy-16α-methyl-1,4-pregnadiene-3,20-dione, melting point 124–126.5° C. (acetone/hexane). UV: $\epsilon_{236}=15,600$.

Example 10

2.0 g. 6α-fluoro-9,11β-dichloro-21-hydroxy-16α-methyl-1,4-pregnadiene-3,20-dione were reacted in the manner described in example 5. The crude product was subjected to chromatography through silica gel. Elution with 10–16% acetone/pentane yielded 1.06 g. 6α-flouro-9α,11β-dichloro-21-butyryloxy-16α-methyl-1,4-pregnadiene-3,20-dione with a melting point between 203–203.5° C. (acetone/hexane). UV: $\epsilon_{237}=16,000$.

Example 21

A solution of 3.3 g. 6α-fluoro-9,11β-dichloro-21-hydroxy-16 α-methyl-1,4-pregnadiene-3,20-dione in 13.2 ml. pyridine and 6.6 ml. valeric acid anhydride was stirred at room temperature for 16 hours. The pyridine and the excess valeric acid anhydride were subsequently distilled off with steam. The residue from the distillation was extracted with methylene chloride. The extract was then washed with sodium bicarbonate and water, dried with sodium sulfate, and concentrated in vacuum. The residue was subjected to chromatography through silica gel. Elution with 10–13% acetone/pentane yielded 2.2 g. 6α-fluoro-9α,11β-dichloro-21-valeryolxy-16α-methyl-1,4-pregnadiene-3,20-dione with a melting point between 122 and 123° C. (acetone/hexane). UV: $\epsilon_{237}=14,800$.

Example 22

5.0 g. 6α,11β-difluoro-9-chloro-21-hydroxy-16α-methyl-1,4-pregnadiene-3,20-dione were reacted with valericacidanhydride in the manner described in example 21. The isolated crude product was twice recrystallized from acetone/hexane. There were obtained 4.40 g. 6α,11β-difluoro-9α-chloro-21-valeryloxy-16α-methyl-1,4-pregnadiene-3,20-dione with a melting point between 142 and 143° C. UV: $\epsilon_{235}=15,800$.

Example 23

A solution of 100 mg. 6α-fluoro-9α,11β-dichloro-21-hydroxy-16α-methyl-1,4-pregnadiene-3,20-dione in 2.0 ml. pyridine was reacted with 400 mg. succinicacidanhydride, subjected to stirring for 24 hours at room temperature and then poured into water and extracted with ether. The ether phase was washed with 4 n sulfuric acid and water, dried, and concentrated in vacuum. The residue was subjected to trituration with hexane, followed by isolation of the crystalline compound. There were obtained 73 mg. 6α-fluoro-9α,11β-dichloro-3,20-dioxo-16α-methyl-1,4-pregnadiene-21-yl-hydrogen-succinate with a melting point 176–179° C. UV: $\epsilon_{235}=15,900$.

Example 24

A solution of 600 mg. 6α,11β-difluoro-9-chloro-21-hydroxy-16α-methyl-1,4-pregnadiene-3,20-dione in 18 ml. conc. formic acid and 5 ml. tetrahydrofuran were reacted with 120 mg. p-toluene-sulfonicacid and were permitted to stand for one hour at room temperature. The reaction mixture was stirred into water and the precipitated product was removed by suction, washed, and taken up with methyl-enechloride. The solution was dried over sodium sulfate and concentrated in vacuum. The residue was subjected to chromatography. After recrystallization from acetone/hexane, 200 mg. 6α,11β-difluoro-9-chloro-21-formyloxy-16α-methyl-1,4-pregnadiene-3,20-dione were obtained having a melting point between 220 and 223° C. UV: $\epsilon_{235}=16,700$.

Example 25

0.45 ml. of sulfurtrioxide was added dropwise at −15° C. to 7.5 ml. anhydrous pyridine. The mixture was reacted at 0° C. with 3.7 g. 6α,11β-difluoro-9-chloro-21-hydroxy-16β-methyl-1,4-pregnadiene-3,20-dione and subsequently stirred for 1 hour at 20° C. The reaction solution was diluted with 80 ml. water, was brought up to a pH of 8.6 with sodium hydroxide and was extracted repeatedly with methylene chloride. The aqueous phase was concentrated in vacuum at 40° C. and the residue was digested with methanol. The undissolved material was removed by filtration. The methanol was then distilled off in vacuum and the residue was dried over phosphorus pentoxide. There were obtained 4.6 g. of sodium-(6α,11β-difluoro-9-chloro-3,20-dioxo-16α-methyl-1,4-pregnadiene-21-Y1)-sulfate, which dissociated above 160° C. upon sintering. UV: $\epsilon_{237}=15,700$.

Example 26

1.0 g. 6α-fluoro-9,11β-dichloro-21-hydroxy-16α-methyl-1,4pregnadiene-3,20-dione were reacted in the manner described in Example 25 with sulfur trioxide/pyridine and subsequently with sodium hydroxide. There were obtained 1.2 g. sodium-(6α-fluoro-9,11β-dichloro-3,20-dioxo-16α-methyl-1,4-pregnadiene-21-yl)-sulfate, which disintegrated above 150° C. upon sintering. UV: $\epsilon_{238}=15,900$.

The following examples illustrate pharmaceutical compositions incorporating effective amounts of the compounds of the invention. The pharmaceutical compositions may be in the form of ointments, tablets, eyedrops, nose drops or eardrops, as desired. They can also be prepared in the form of solutions suited for injection. Preferably, the pharmaceutical compositions should contain the following amounts of the compounds of the invention:

1. ointments: 0.0001 up to 0.1% active ingredient
2. tablets: 0.01 to 50 mg. per tablet
3. eye, nose and eardrops: 0.01 to 1% active ingredient
4. solutions for injection: 0.1 to 10% active ingredient Preferably, the composition is applied in a dose of about 1 to 100 mg. in the case of an ointment, about 1 to 10 tablets, about 1 to 20 drops, and 0.1 to 3 ml. solution for injection, respectively, per day.

Example 27

Composition for an Ointment:
0.01 g. 6α,11β-difluoro-9-chloro-21-trimethyl-acetoxy-16α-methyl-1,4-pregnadiene-3,20-dione
5.00 g. white wax DAB 6 (Deutsches Arzneibuch 6)
5.00 g. wool fat, anhydrous, DAB 6
20.00 g. Vaseline, white DAB 6
25.00 g. Amphocerin K "Dehydag"

14.97 g. paraffin oil, liquid DAB 6
30.00 g. water, desalted
0.02 Crematest Perfume Oil No. 6580 "Dragee"

Example 28

Composition for an Ointment:
0.01% 6α,11β-difluoro-9-chloro-21-hydroxy-16α-methyl-1,4-pregnadiene-3,20-dione
0.01% 6α,11β-difluoro-9-chloro-21-butyryl-oxy-16α-methyl-1,4-pregnadiene-3,20-dione
2.50% Allercurhexachlorophenate, micronized to a particle size of about 8μ (Allercur = registered trade mark for 1-chlorobenzyl-2-pyrrolidyl-methylbenzimidazole)
6.00% Hostaphat KW 340$^{(R)}$ (tert. ester of phosphoric acid and paraffin alcohol tetraglycolether)
0.10% sorbic acid
10.00% neutral oil (Migloyol 812$^{(R)}$)
3.50% stearyl alcohol
1.50% wool fat, anhydrous, DAB 6
75.90% desalted water

Example 29

Composition for a Tablet:
0.250 mg. 6α-fluoro-9,11β-dicholro-21-trimethylacetoxy-16α-methyl-1,4-pregnadiene-3,20-dione
36.000 mg. lactose DAB 6
75.780 mg. cornstarch USP XVI
0.500 mg. soidum laurylsulfate (Texapon K 12) "Dehydag," USP XVI
1.400 mg. gelatin, white DAB 6
6.000 mg. talcum DAB 6
0.024 mg. Nipagin M (p-oxybenzoic acid methylester) DAB 6, 3. (Deutsches Arzneibuch 6, 3rd Supplement)
0.011 mg. Nipasol M (p-oxybenzoic acid-propylester) DAB 6, 3rd Suppl.
0.035 mg. pigment Pistachio Green "Dragoco"

Example 30

Composition for a Tablet:
0.025 mg. 6α-fluoro-9,11β-dichloro-21-acetoxy-16α-methyl-1,4-pregnadiene-3,20-dione
36.475 mg. lactose DAB 6
75.530 mg. cornstarch USP XVI
0.500 mg. sodium laurylsulfate (Texapon K 12) "Dehydag" USP XVI
1.400 mg. gelatin, white, DAB 6
6.000 mg. talcum DAB 6
0.024 mg. NIPAGIN M (p-oxybenzoic acid methylester DAB 6, 3rd Suppl.
0.011 mg. Nipasol M (p-oxybenzoic acid propylester) DAB 6, 3rd Suppl.
0.035 mg. pigment Pistachio Green "Dragoco"

Example 31

Composition for a Tablet:
0.050 mg. 6α,11β-difluoro-9-chloro-21-acetoxy-16α-methyl-1,4-pregnadiene-3,20-dione
76.515 mg. cornstarch USP XVI
36.000 mg. lactose, DAB 6
6.000 mg. talcum, DAB 6
1.400 mg. gelatin, white, DAB 6
0.024 mg. NIPAGIN M (p-oxybenzoic acid methylester) DAB 6, 3rd Suppl.
0.011 mg. NIPASOL M (P-oxybenzoic acid propylester) DAB 6 3rd Suppl.
As is customary, the tablets were produced on a tablet press.

Example 32

Preparation of Eardrops:
100 mg. 6α,11β-difluoro-9-chloro-21-hexanoyloxy-16α-methyl-1,4-pregnadiene-3,20-dione were dissolved in 100 ml. 1,2-propylene glycol/ethyl alcohol (9:1).

Example 33

Preparation of eyedrops (Oily):
100 mg. 6α-fluoro-9,11β-dichloro-21-valeryloxy-16α-methyl-1,4-pregnadiene-3,20-dione were dissolved in 100 ml. castor oil. After addition of 200 mg. Chloramphenicol (or another bacteriostatic agent) thereto, the solution was sterilized by filtration and aseptically drawn off.

Example 34

Preparation of eyedrops (aqueous):
100 mg. sodium-(6α,11β-difluoro-9-chloro-3,20-dioxo-16α-methyl-1,4-pregnadiene-21-Y1)-sulfate were dissolved in 100 ml. distilled water and after addition thereto of 5 g. sulfaethylthiodiazole were sterilized by filtration and drawn off aseptically.

Example 35

Preparation of Nose Drops (aqueous):
100 mg. sodium-(6α-fluoro-9,11β-dichloro-3,20-dioxo-16α-methyl-1,4-pregnadiene-21-Y1)-sulfate and 2 g. Chloramphenicol were dissolved in 100 ml. distilled water.

Example 36

Preparation of a Solution for Injection Purposes:
50 mg. 6α,11β-difluoro-9-chloro-21-valeryl-oxy-16α-methyl-1,4-pregnadiene-3,20-dione were dissolved in 10 ml. sesame oil and the solution was poured into 1-ml. ampuls and sterilized in the customary manner.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. 11-halogen-substituted-steroids of the formula

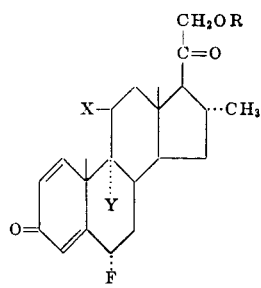

wherein R is hydrogen, aliphatic acyl of up to 15 carbon atoms or aliphatic acyl having up to a total of 15 carbon atoms and being substituted with chlorine, a carboxylic acid group, a nitryl group or a sulfate group and wherein X and Y are halogen, the molecular weight of Y being at least equal to that of X.

2. The compound of claim 1 which is 6α,11β-difluoro-9-chloro-21-formyloxy-16α-methyl-1,4-pregnadiene-3,20-dione.

3. The compound of claim 1 which is 6α,11β-difluoro-9-bromo-21-acetoxy-16α-methyl-1,4-pregnadiene-3,20-dione.

4. The compound of claim 1 which is 6α,11β-difluoro-9-chloro-21-acetoxy-16α-methyl-1,4-pregnadiene-3,20-dione.

5. The compound of claim 1 which is 6α,11β-difluoro-9-bromo-21-hydroxy-16α-methyl-1,4-pregnadiene-3,20-dione.

6. The compound of claim 1 which is 6α,11β-difluoro-9-chloro-21-hydroxy-16α-methyl-1,4-pregnadiene-3,20-dione.

7. The compound of claim 1 which is 6α,11β-difluoro-9-bromo-21-butyryloxy-16α-methyl-1,4-pregnadiene-3,20-dione.

8. The compound of claim 1 which is 6α,11β-difluoro-9-chloro-21-butyryloxy-16α-methyl-1,4-pregnadiene-3,20-dione.

9. The compound of claim 1 which is 6α,11β-difluoro-9-bromo-21-trimethylacetoxy-16α-methyl-1,4-pregnadiene-3,20-dione.

10. The compound of claim 1 which is 6α,11β-difluoro-9-chloro-21-trimethylacetoxy-16α-methyl-1,4-pregnadiene-3,20-dione.

11. The compound of claim 1 which is 6α-fluor-9,11β-dichloro-21-acetoxy-16α-methyl-1,4-pregnadiene-3,20-dione.

12. The compound of claim 1 which is 6α-fluoro-11β-chloro-9-bromo-21-acetoxy-16α-methyl-1,4-pregnadiene-3,20-dione.

13. The compound of claim 1 which is 6α-fluoro-11β-chloro-9-bromo-21-hydroxy-16α-methyl-1,4-pregnadiene-3,20-dione.

14. The compound of claim 1 which is 6α-fluoro-11β-chloro-9-bromo-21-chloroacetoxy-16α-methyl-1,4-pregnadiene-3,20-dione.

15. The compound of claim 1 which is 6α-fluoro-9,11β-dichloro-21-hydroxy-16α-methyl-1,4-pregnadiene-3,20-dione.

16. The compound of claim 1 which is 6α-fluoro-11β-chloro-9-bromo-21-hexanoyloxy-16α-methyl-1,4-pregnadiene-3,20-dione.

17. The compound of claim 1 which is 6α-fluoro-9,11β-dichloro-21-nitryloxy-16α-methyl-1,4-pregnadiene-3,20-dione.

18. The compound of claim 1 which is 6α-fluoro-9,11β-dichloro-21-trimethylacetoxy-16α-methyl-1,4-pregnadiene-3,20-dione.

19. The compound of claim 1 which is 6α,11β-difluoro-9-chloro-21-hexanoyloxy-16α-methyl-1,4-pregnadiene-3,20-dione.

20. The compound of claim 1 which is 6α-fluoro-9,11β-dichloro-21-hexanoyloxy-16α-methyl-1,4-pregnadiene-3,20-dione.

21. The compound of claim 1 which is 6α-fluoro-9,11β-dichloro-21-butyryloxy-16α-methyl-1,4-pregnadiene-3,20-dione.

22. The compound of claim 1 which is 6α-fluoro-9,11β-dichloro-21-valeryloxy-16α-methyl-1,4-pregnadiene-3,20-dione.

23. The compound of claim 1 which is 6α,11β-difluoro-9-chloro-21-valeryloxy-16α-methyl-1,4-pregnadiene-3,20-dione.

24. The compound of claim 1 which is 6α-fluro-9α,11β-dichloro-3,20-dioxo-16α-methyl-1,4-pregnadiene-21-yl-hydrogen-succinate.

25. The compound of claim 1 which is sodium-(6α,11β-difluoro-9-chloro-3,20-dioxo-16α-methyl-1,4-pregnadine-21-yl)-sulfate.

26. The compound of claim 1 which is sodium-(6α-fluoro-9,11β-dichloro-3,20-dioxo-16α-methyl-1,4-pregnadiene-21 yl)-sulfate.